(12) United States Patent
De Soto et al.

(10) Patent No.: US 11,783,070 B2
(45) Date of Patent: Oct. 10, 2023

(54) MANAGING SENSITIVE INFORMATION USING A TRUSTED PLATFORM MODULE

(71) Applicant: RED HAT, INC., Raleigh, NC (US)

(72) Inventors: Ricardo Noriega De Soto, Madrid (ES); Michael Bursell, Halstead (GB); Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 228 days.

(21) Appl. No.: 17/234,087

(22) Filed: Apr. 19, 2021

(65) Prior Publication Data
US 2022/0335142 A1 Oct. 20, 2022

(51) Int. Cl.
*G06F 21/62* (2013.01)
*H04L 9/30* (2006.01)
*H04L 9/40* (2022.01)

(52) U.S. Cl.
CPC ........ *G06F 21/6218* (2013.01); *H04L 9/3073* (2013.01); *H04L 63/0435* (2013.01); *H04L 63/0442* (2013.01)

(58) Field of Classification Search
CPC .................................................. G06F 21/06218
See application file for complete search history.

(56) References Cited

U.S. PATENT DOCUMENTS

| 10,007,797 | B1* | 6/2018 | Miller | ................. H04L 63/0428 |
| 10,505,730 | B2 | 12/2019 | Masters | |
| 2004/0168066 | A1* | 8/2004 | Alden | ................... H04L 63/083 713/182 |
| 2006/0053302 | A1* | 3/2006 | Yasaki | ................... H04L 9/0897 713/176 |
| 2006/0059574 | A1* | 3/2006 | Fayad | .............. H03K 19/17768 726/34 |
| 2008/0059799 | A1 | 3/2008 | Scarlata | |
| 2009/0075630 | A1* | 3/2009 | Mclean | ............... H04L 63/0428 455/410 |
| 2018/0007040 | A1 | 1/2018 | Thom et al. | |
| 2018/0091484 | A1* | 3/2018 | Atta | ..................... G06F 15/7871 |
| 2020/0250318 | A1 | 8/2020 | Al Belooshi | |

(Continued)

OTHER PUBLICATIONS

Chen, C., et al., "CTPM: A Cloud TPM for Cross-Device Trusted Applications," 11th USENIX Symposium on Networked Systems Design and Implementation, 2014, https://www.usenix.org/system/files/conference/nsdi14/nsdi14-paper-chen.pdf.

(Continued)

*Primary Examiner* — Bradley W Holder
(74) *Attorney, Agent, or Firm* — Kilpatrick Townsend & Stockton LLP

(57) ABSTRACT

Sensitive information can be managed using a trusted platform module. For example, a system can encrypt target information using a cryptographic key to generate encrypted data. The system can also receive an encrypted key from a trusted platform module, where the encrypted key is a version of the cryptographic key that is encrypted using a public key stored in the trusted platform module. The system can then transmit the encrypted data and the encrypted key to a remote computing system, for example to store the encrypted data and the encrypted key on the remote computing system. Using these techniques, the target information may be secured and stored in remote locations.

20 Claims, 3 Drawing Sheets

(56) References Cited

U.S. PATENT DOCUMENTS

2021/0021418 A1    1/2021   Makhalov et al.

OTHER PUBLICATIONS

Cristensen, E., "Managing Kubernetes Secrets Securely with GitOps," ITNEXT, 2020, https://itnext.io/managing-kubernetes-secrets-securely-with-gitops-b8174b4f4d30.

Wang, J., et al., "SvTPM: A Secure and Efficient vTPM in the Cloud," Wuhan University, 2019, https://arxiv.org/pdf/1905.08493.pdf.

"TPM 2.0: Securing IoT Deployments at the Edge," Premio Inc., 2020, https://premioinc.com/blogs/blog/tpm-2-0-securing-iot-deployments-at-the-edge.

Chetal, A., et al., "Cloud Native Security Whitepaper," GitHub, Inc., 2020, https://github.com/cncf/sig-security/blob/master/security-whitepaper/cloud-native-security-whitepaper.md.

Sun, H., et al., "eTPM: A Trusted Cloud Platform Enclave TPM Scheme Based on Intel SGX Technology," Sensors, 2018, https://www.mdpi.com/1424-8220/18/11/3807/htm.

European Patent Application No. 21177812.1, Extended European Search Report dated Nov. 19, 2021, 9 pages.

\* cited by examiner

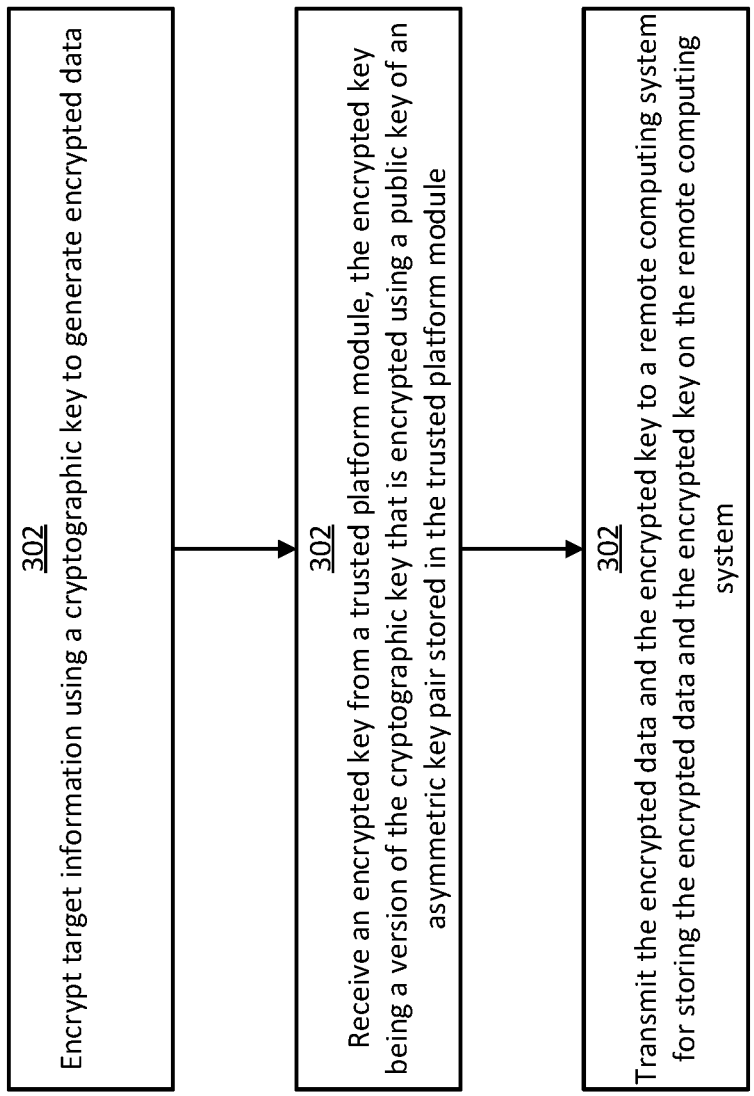

MANAGING SENSITIVE INFORMATION USING A TRUSTED PLATFORM MODULE

TECHNICAL FIELD

The present disclosure relates generally to cryptography and data security. More specifically, but not by way of limitation, this disclosure relates to managing sensitive information using a trusted platform module of a computing system.

BACKGROUND

Computer security has become increasingly important. To assist with various facets of computer security, trusted platform modules have been developed. A trusted platform module is a physical hardware chip that includes a secure cryptographic processor, which can be a dedicated microcontroller designed to secure hardware through integrated cryptographic keys. The cryptographic processor can include a random number generator, a RSA key generator, a SHA-1 hash generator, an encryption-decryption-signature engine, or any combination of these. Trusted platform modules can also include persistent memory and versatile memory. The persistent memory may include an endorsement key and a storage root key (SRK). The versatile memory may include platform configuration registers, attestation identity keys, and storage keys. Trusted platform modules can be built-in to computing devices, for example as a part of the motherboard or another hardware component of a desktop computer, laptop computer, or server.

BRIEF DESCRIPTION OF THE DRAWINGS

FIG. 3 shows a flow chart of an example of a process for managing sensitive information using a trusted platform module according to some aspects of the present disclosure.

DETAILED DESCRIPTION

Figure 1:
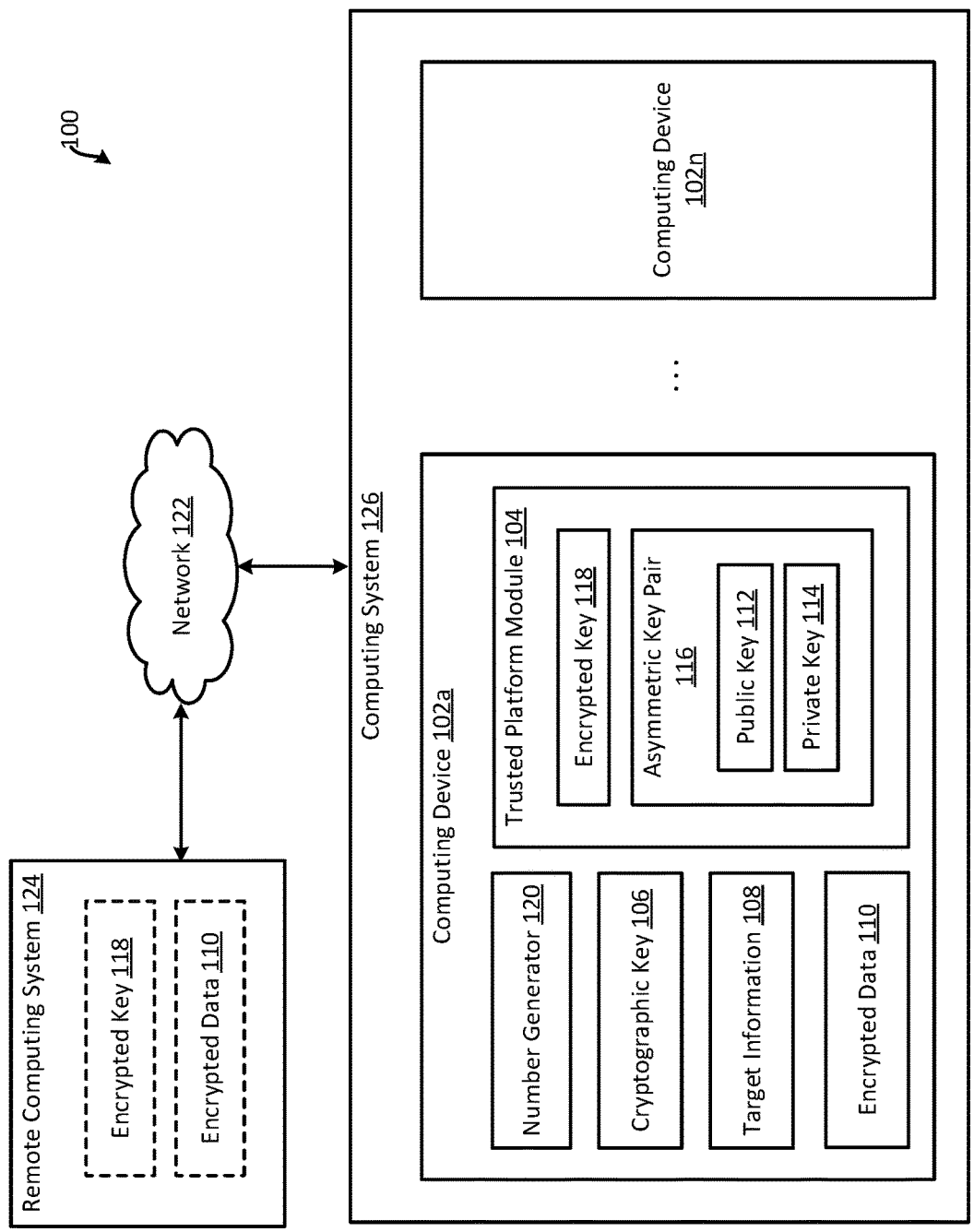
FIG. 1 shows a block diagram of an example of a system for managing sensitive information using a trusted platform module according to some aspects of the present disclosure.

There can be many situations in which it may be beneficial to store sensitive information such as passwords and personally identifiable information (P11) on a remote computing system. As one example, a computing device may transmit sensitive information to a remote computing system for storage thereon to free up memory of the computing device, particularly if the computing device has a relatively small amount of memory. This may be especially prevalent in the context of edge computing systems, which may have a relatively small amount of memory but may be responsible for processing relatively large amounts of data. As another example, a computing device can use configuration data that is stored in a remote computing system to perform an operational process such as a reconciliation process, as described in greater detail later on. The configuration data can be considered sensitive information because the security of the computing device may be compromised if the configuration data is accessed by an unauthorized party. Storing the configuration data in the remote computing system may improve security by allowing a user to easily monitor and update the configuration data, without having to grant the user access to the computing device itself.

While there are benefits to storing sensitive information on a remote computing system, there are also inherent risks. For example, the operators of the remote computing system may access the sensitive information without the owner's permission and may use the sensitive information against the wishes of the owner. Additionally, a malicious actor could compromise (e.g., hack) the remote computing system and thereby obtain access to the sensitive information.

Some examples of the present disclosure can overcome one or more of the abovementioned problems by providing a way to secure sensitive information for storage on a remote computing system. More specifically, a computing device of the present disclosure can encrypt sensitive information using a cryptographic key to generate encrypted data. The computing device can also encrypt the cryptographic key using a public key of an asymmetric key pair, where the asymmetric key pair is stored in a trusted platform module that is internal to the computing device. The computing device can then transmit the encrypted data and the encrypted key to a remote computing system for secure storage thereon. Since the remote computing system does not have access to the trusted platform module, and thus does not have access to the asymmetric key pair used to generate the encrypted key, the remote computing system cannot decrypt the encrypted data to access the sensitive information. And since the trusted platform module is internal to the computing device, other computing devices cannot access the trusted platform module to decrypt the encrypted key. The encrypted data and the encrypted key may then be deleted from the computing device, for example to conserve memory and help protect the sensitive information (e.g., should the computing device be compromised by a malicious actor).

At a later point in time, the computing device can retrieve the encrypted data and the encrypted key from the remote computing system, provide the encrypted key to the trusted platform module to obtain the original cryptographic key, and decrypt the encrypted data using the original cryptographic key. Using these techniques, the computing device can encrypt and decrypt the sensitive information in a way that also allows the sensitive information to be securely stored in a remote location.

One particular example can arise in the context of GitOps. GitOps is an automated way to perform cluster management and application deployment. GitOps works by using a repository that is remote from a computing cluster as a source of truth for infrastructure and application deployment on the computing cluster. The repository can include configuration data describing an expected configuration (e.g., hardware and software configuration) of the computing cluster. Software agents executing on the computing cluster can obtain the configuration data from the repository and use it to detect divergences between the actual configuration of the computing cluster and the expected configuration of the computing cluster. In response to detecting such a divergence, the computing cluster can execute a reconciliation process to automatically update or rollback the computing cluster in an effort to resolve the difference.

In the above GitOps context, the sensitive information may be the configuration data describing the cluster's expected configuration, which may be sensitive because the cluster's security could be compromised if its expected configuration is exposed to an unauthorized party. The description of the cluster's expected configuration can also include other sensitive details such as passwords and security tokens. The computing cluster can encrypt the sensitive information using a cryptographic key to generate encrypted data. The computing cluster can also encrypt the cryptographic key using a public key stored in a trusted platform module of the computing cluster. The computing cluster can then transmit the encrypted data and the encrypted key to the remote repository for secure storage thereon. As a result, the sensitive information may remain safe even if the repository is compromised by a malicious actor.

At a later point in time, the computing cluster may be configured to execute the abovementioned reconciliation process to ensure that the computing cluster's current configuration matches an expected configuration described in the sensitive information. To do so, the computing cluster can download the encrypted data and the encrypted key from the repository, provide the encrypted key to the trusted platform module to obtain the original cryptographic key, and decrypt the encrypted data using the cryptographic key to obtain the original sensitive information. The computing cluster can then compare its current configuration to the expected configuration (described in the sensitive information) to determine if they match. If not, the computing cluster can automatically update or rollback the computing cluster in an effort to reconcile the difference. In this way, the techniques described herein can allow the sensitive information to be safely stored in and retrieved from the remote repository as part of a GitOps process.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing sensitive information using a trusted platform module 104 according to some aspects of the present disclosure. The system 100 can include a computing system 126, which may include any number and combination of computing devices 102a-n. Examples of such computing devices 102a-n can include servers, desktop computers, laptop computers, mobile phones, wearable devices such as smart watches, networking hardware (e.g., gateways, firewalls, and routers), or any combination of these. In some examples, the computing system 126 can be a distributed computing system, such as a data grid or a computing cluster, in which the computing devices 102a-n can serve as nodes. The computing system 126 can be positioned at any suitable geographical location and may form any suitable part of a network infrastructure. For example, the computing system 126 can be an edge computing system positioned at a physical edge of a network infrastructure, or the computing system 126 can be a non-edge computing system positioned at a non-edge location of the network infrastructure.

The computing system 126 can include a computing device 102a with target information 108. The target information 108 can be any information that is to be secured using one or more of the techniques described herein. The target information 108 may be manually selected by a user or programmatically selected by software (e.g., from among a group of information accessible to the computing device 102a). In some examples, the target information 108 can include one or more types of sensitive information. Examples of such sensitive information can include usernames; passwords; PIN numbers; security tokens; secrets; security keys such as a secure shell (SSH) key; personally identifiable information (PII) such as names, social security numbers, credit card numbers, license numbers, passport numbers, address information, bank account information, and biometric information; or any combination of these. Another example of such sensitive information can include configuration data for at least some of the computing system 126 (e.g., the computing device 102a). In some examples, the configuration data can indicate a hardware configuration associated with the computing system 126, such as the hardware, hardware settings, and hardware topology of the computing system 126. Additionally or alternatively, the configuration data may indicate a software configuration associated with the computing system 126, such as the software, software settings, and software topology of the computing system 126. Other types of target information 108 may also be used. The computing device 102a may obtain the target information 108 using any suitable method. For example, the computing device 102a may generate the target information 108 or may receive the target information 108 from any suitable source, such as a database.

To secure the target information 108, the computing device 102a can encrypt the target information 108 with a cryptographic key 106 to generate encrypted data 110. The cryptographic key 106 may be a symmetric encryption key. The computing device 102a can obtain the cryptographic key 106 using any suitable technique. For example, the computing device 102a can generate the cryptographic key 106 using a number generator 120, such as a random number generator or a pseudo-random number generator, that may exist outside the trusted platform module 104. In some such examples, the computing device 102a may implement a key-rotation scheme so that the cryptographic key 106 is changed relatively frequently, for example so that a unique cryptographic key is generated every hour or for each piece of target information 108 to be secured. In other examples example, the computing device 102a can transmit a request for the cryptographic key 106 to the trusted platform module 104 associated with the computing device 102a. The trusted platform module 104 can receive the request, generate the cryptographic key 106 in response to the request, and provide the cryptographic key 106 to the computing device 102a (e.g., to a processor of the computing device 102a). In some examples, the trusted platform module 104 can generate the cryptographic key 106 using an internal number generator, such as a random number generator or a pseudo-random number generator.

The computing device 102a can also secure the cryptographic key 106 using the trusted platform module 104. For example, if the computing device 102a generated the cryptographic key 106 independently of the trusted platform module 104, then the computing device 102a can transmit a request that includes the cryptographic key 106 to the trusted platform module 104 for encrypting the cryptographic key 106. As another example, if the computing device 102a used the trusted platform module 104 to generate the cryptographic key 106, then the trusted platform module 104 may already have the cryptographic key 106, so the computing device 102a can transmit a request that excludes the cryptographic key 106 to the trusted platform module 104 for encrypting the cryptographic key 106. Either way, the trusted platform module 104 can encrypt the cryptographic key 106 using a public key 112 of an asymmetric key pair 116 stored in the trusted platform module 104, thereby generating an encrypted key 118. In some examples, the asymmetric key pair 116 may be generated by trusted platform module 104 using a storage root key (SRK), a RSA key generator, and/or an internal number generator of the trusted platform module 104. By encrypting the cryptographic key 106 using an asymmetric key pair 116 that is unique to the trusted platform module 104, only the same trusted platform module 104 can be used in the future to decrypt the encrypted data 110. After generating the encrypted key 118, the trusted platform module 104 can provide the encrypted key 118 to the computing device 102a. Since the other hardware of the computing device 102a cannot access the asymmetric key pair 116 stored in the trusted platform module 104, the computing device 102a may be unable to decrypt the encrypted key 118 without relying on the trusted platform module 104.

Having generated the encrypted data 110 and the encrypted key 118, the computing device 102a can transmit the encrypted data 110 and the encrypted key 118 to a remote computing system 124. For example, the computing device 102a can transmit the encrypted data 110 and the encrypted key 118 over a network 122 (e.g., a local area network or the Internet) to the remote computing system 124 for storage thereon. The remote computing system 124 may serve as a repository for such information, in some examples. The computing device 102a may then delete the target information 108, the cryptographic key 106, the encrypted data 110, the encrypted key 118, or any combination of these, for example to conserve memory and help protect the target information 108. Using these techniques, the target information 108 can be safely stored in an encrypted format on the remote computing system 124.

At a later point in time, it may be desirable for the computing device 102a to access the target information 108. For example, the computing device 102a may need the target information 108 to configure the computing system 126, to authenticate a user to access secure data, or to perform other functionality. So, the computing device 102a can receive (e.g., download) the encrypted data 110 and the encrypted key 118 from the remote computing system 124. The computing device 102a can then provide the encrypted key 118 to the trusted platform module 104, which can decrypt the encrypted key 118 using a private key 114 of the asymmetric key pair 116 to obtain the original cryptographic key 106. The trusted platform module 104 can then provide the cryptographic key 106 to the computing device 102a. The computing device 102a can receive the cryptographic key 106 and use it to decrypt the encrypted data 110, thereby obtaining the target information 108. In this way, the computing device 102a can access the target information 108 as needed by interfacing with the trusted platform module 104.

The above techniques can be repeated for multiple pieces of target information on a single computing device 102a or on multiple computing devices 102a-n, with a different cryptographic key being used to encrypt each respective piece of target information. For example, the computing device 102a may obtain (e.g., generate or receive) a new piece of target information that is different from the target information 108. The computing device 102a can then encrypt the new piece of target information using a new cryptographic key that is different from the cryptographic key 106, to generate new encrypted data. The computing system 126 can also interact with the trusted platform module 104 to obtain a new encrypted key, which can be a version of the new cryptographic key that is encrypted using the public key 112. The computing system 126 can then transmit the new encrypted data and the new encrypted key over the network 122 to the remote computing system 124 for storage thereon.

Although FIG. 1 shows a certain number and arrangement of components for illustrative purposes, other examples can include more components, fewer components, different components, or a different arrangement of the components than is shown in FIG. 1. For instance, the trusted platform module 104 may be external to the computing device 102a and communicatively coupled to the computing device 102a in other examples. And although FIG. 1 only shows computing device 102a as having certain components (e.g., the trusted platform module 104, cryptographic key 106, target information 108, etc.) for simplicity, it will be appreciated that some or all of the other computing devices 102b-n in the computing system 126 may have similar components.

Figure 2:
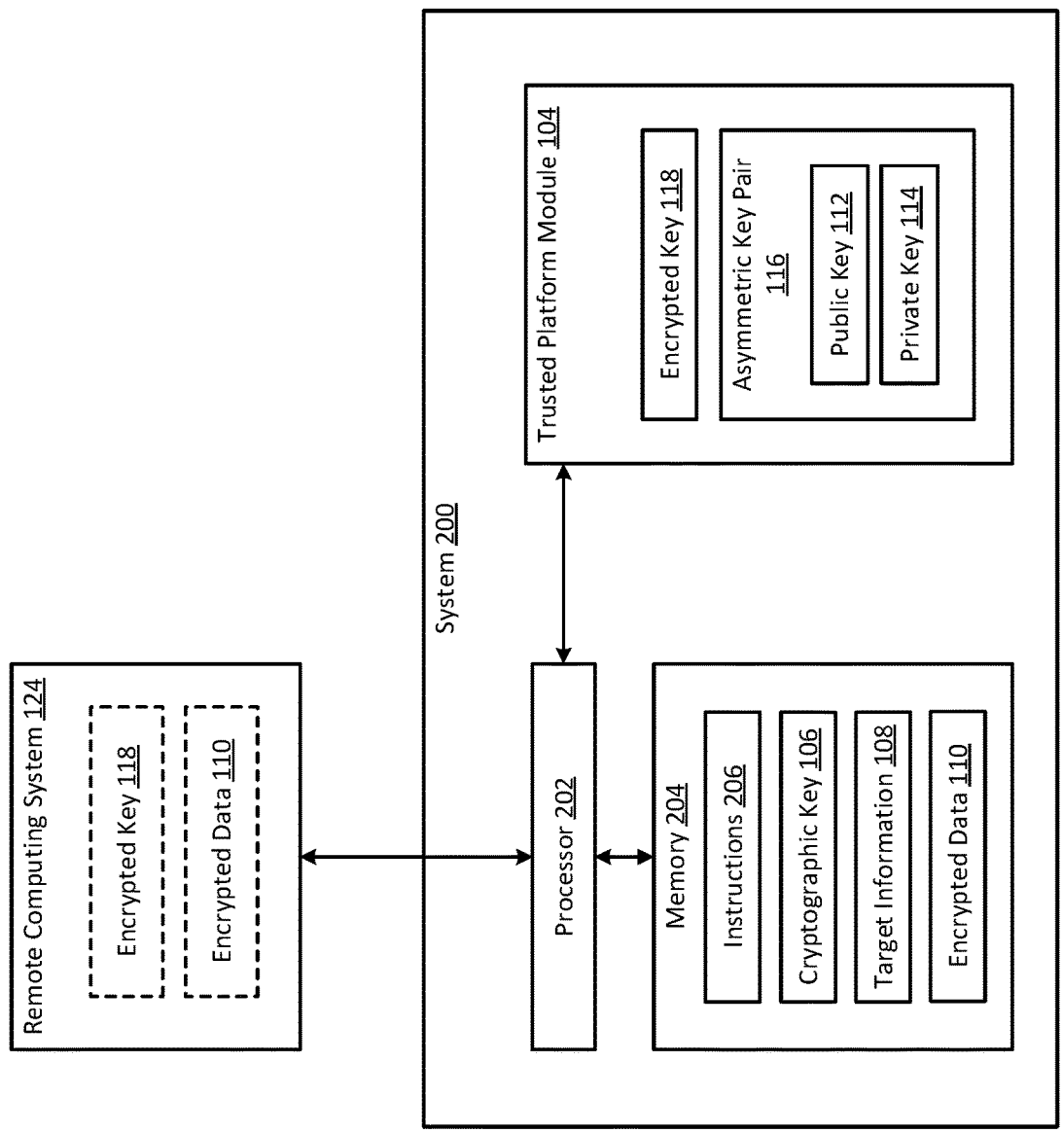
FIG. 2 shows a block diagram of another example of a system for managing sensitive information using a trusted platform module according to some aspects of the present disclosure.

FIG. 2 shows a block diagram of another example of a system 200 for managing sensitive information using a trusted platform module 104 according to some aspects of the present disclosure. The system 200 includes a processor 202 communicatively coupled to a memory 204 and a trusted platform module 104. In some examples, the processor 202, the memory 204, and/or the trusted platform module 104 can be part of the same computing device, such as computing device 102a of FIG. 1. In other examples, the processor 202, the memory 204, and/or the trusted platform module 104 can be distributed from (e.g., remote to) one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The processor 202 can execute the instructions 206 to perform operations. For example, the processor 202 can encrypt target information 108 using a cryptographic key 106 to generate encrypted data 110. The processor 202 can also transmit a request to the trusted platform module 104 to generate an encrypted key 118 based on the cryptographic key 106. In response to the request, the trusted platform module 104 can generate the encrypted key 118 by encrypting the cryptographic key 106 using a public key 112 of an asymmetric key pair 116 stored in the trusted platform module 104. Thus, the encrypted key 118 can be a version of the cryptographic key 106 that is encrypted using the public key 112. The trusted platform module 104 can then transmit the encrypted key 118 to the processor 202 as a response to the request. The processor 202 can receive the encrypted key 118 from the trusted platform module 104. The processor 202 can then transmit the encrypted data 110, the encrypted key 118, or both of these to a remote computing system 124. For example, the processor 202 can transmit the encrypted data 110 and the encrypted key 118 to the remote computing system 124 for storing the encrypted data 110 and the encrypted key 118 thereon. The processor 202 may then delete the target information 108, the cryptographic key 106, the encrypted data 110, the encrypted key 118, or any combination of these from memory 204.

Thereafter, it may be desirable to decrypt the encrypted data 110. So, the processor 202 can receive the encrypted key 118 and the encrypted data 110 from the remote computing system 124. The processor 202 can transmit the encrypted key 118 to the trusted platform module 104, which can decrypt the encrypted key 118 using a private key 114 of the asymmetric key pair 116 to obtain the cryptographic key 106. The trusted platform module 104 can then provide the cryptographic key 106 to the processor 202. The processor 202 can decrypt the encrypted data 110 using the cryptographic key 106 to obtain the target information 108. In this way, the processor 202 can access the target information 108 as needed by using the trusted platform module 104.

In some examples, the processor 202 can implement the process shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processor 202 encrypts target information 108 using a cryptographic key 106 to generate encrypted data 110. For example, the processor 202 can use the cryptographic key 106 in combination with a cipher (e.g., an encryption algorithm) to transform the target information 108 into the encrypted data 110.

In block 304, the processor 202 receives an encrypted key 118 from a trusted platform module 104. The encrypted key 118 can be a version of the cryptographic key 106 that is encrypted using a public key 112 of an asymmetric key pair 116 stored in a trusted platform module 104.

For example, the processor 202 can transmit a request for the encrypted key 118 to the trusted platform module 104. The request may or may not include the cryptographic key 106. The trusted platform module 104 can receive the request, generate the encrypted key 118 in response to the request, and transmit the encrypted key to the processor 202. The trusted platform module 104 can generate the encrypted key 118 by encrypting the cryptographic key 106 using the public key 112 and a cipher.

In block 306, the processor 202 transmits the encrypted data 110 and the encrypted key 118 to a remote computing system 124 for storing the encrypted data 110 and the encrypted key 118 on the remote computing system 124. For example, the processor 202 can transmit the encrypted data 110 and the encrypted key 118 over a network to a remote computing system 124. The remote computing system 124 can receive and store the encrypted data 110 and the encrypted key 118 in one or more data stores, which may for example include one or more hard disks or solid state drives (SSDs).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to:
    encrypt target information using a cryptographic key to generate encrypted data, the target information indicating an expected configuration of a computing cluster;
    receive an encrypted key from a trusted platform module, the encrypted key being a version of the cryptographic key that is encrypted using a public key of an asymmetric key pair stored in the trusted platform module; and
    transmit the encrypted data and the encrypted key to a remote computing system for storing the encrypted data and the encrypted key on the remote computing system, wherein the computing cluster is configured to retrieve the encrypted data and the encrypted key from the remote computing system, decrypt the encrypted key to produce the cryptographic key, decrypt the encrypted data using the cryptographic key to access the target information, and configure itself based on the target information.

2. The non-transitory computer-readable medium of claim 1, further comprising program code that is executable by the processor for causing the processor to, subsequent to encrypting the target information using the cryptographic key, delete the cryptographic key and the encrypted key from one or more memories.

3. The non-transitory computer-readable medium of claim 1, further comprising program code that is executable by the processor for causing the processor to, subsequent to transmitting the encrypted data to the remote computing system, delete the encrypted data from one or more memories.

4. The non-transitory computer-readable medium of claim 1, further comprising program code that is executable by the processor for causing the processor to:
    generate the cryptographic key by using a number generator that is external to the trusted platform module; and
    provide the cryptographic key to the trusted platform module for use by the trusted platform module in generating the encrypted key.

5. The non-transitory computer-readable medium of claim 1, further comprising program code that is executable by the processor for causing the processor to generate the cryptographic key by using the trusted platform module.

6. The non-transitory computer-readable medium of claim 1, wherein the cryptographic key is a symmetric encryption key.

7. The non-transitory computer-readable medium of claim 1, further comprising program code that is executable by the processor for causing the processor to, subsequent to transmitting the encrypted data and the encrypted key to the remote computing system:
    receive the encrypted data and the encrypted key from the remote computing system;
    provide the encrypted key to the trusted platform module, the trusted platform module being configured to decrypt the encrypted key using a private key of the asymmetric key pair to obtain the cryptographic key;
    receive the cryptographic key from the trusted platform module; and
    obtain the target information by decrypting the encrypted data using the cryptographic key.

8. The non-transitory computer-readable medium of claim 1, wherein the processor is part of a distributed computing system that is separate from the remote computing system, and wherein the remote computing system includes a repository that is accessible to the distributed computing system over a network.

9. The non-transitory computer-readable medium of claim 1, wherein the target information describes an expected hardware configuration or an expected software configuration of the computing cluster.

10. The non-transitory computer-readable medium of claim 1, wherein the target information includes a username, a password, a secure shell (SSH) key, a security token, or personally identifiable information.

11. A method comprising:
    encrypting, by a processor, target information using a cryptographic key to generate encrypted data, the target information indicating an expected configuration of a computing cluster;
    receiving, by the processor, an encrypted key from a trusted platform module, the encrypted key being a version of the cryptographic key that is encrypted using a public key of an asymmetric key pair stored in the trusted platform module; and
    transmitting, by the processor, the encrypted data and the encrypted key to a remote computing system for storing the encrypted data and the encrypted key on the remote computing system,
    wherein the computing cluster is configured to retrieve the encrypted data and the encrypted key from the remote computing system, decrypt the encrypted key to produce the cryptographic key, decrypt the encrypted data using the cryptographic key to access the target information, and configure itself based on the target information.

12. The method of claim 11, further comprising:
    subsequent to encrypting the target information using the cryptographic key, deleting the cryptographic key and the encrypted key from one or more memories; and
    subsequent to transmitting the encrypted data to the remote computing system, deleting the encrypted data from the one or more memories.

13. The method of claim 11, further comprising:
    generating the cryptographic key by using a number generator that is external to the trusted platform module; and
    providing the cryptographic key to the trusted platform module for use by the trusted platform module in generating the encrypted key.

14. The method of claim 11, further comprising, subsequent to transmitting the encrypted data and the encrypted key to the remote computing system:
    receiving the encrypted data and the encrypted key from the remote computing system;
    providing the encrypted key to the trusted platform module, the trusted platform module being configured to decrypt the encrypted key using a private key of the asymmetric key pair to obtain the cryptographic key;
    receiving the cryptographic key from the trusted platform module; and
    obtaining the target information by decrypting the encrypted data using the cryptographic key.

15. The method of claim 11, wherein the computing cluster is configured to configured itself by performing a reconciliation operation, the reconciliation operation being configured to resolve a difference between a current configuration of the computing cluster and the expected configuration of the computing cluster.

16. A system comprising:
    a trusted platform module including an asymmetric key pair;
    a processor communicatively coupled to the trusted platform module; and
    a memory including instructions that are executable by the processor for causing the processor to:
        encrypt target information using a cryptographic key to generate encrypted data, the target information indicating an expected configuration of a computing cluster;
        receive an encrypted key from the trusted platform module, the encrypted key being a version of the cryptographic key that is encrypted using a public key of the asymmetric key pair; and
        transmit the encrypted data and the encrypted key to a remote computing system for storing the encrypted data and the encrypted key on the remote computing system,
        wherein the computing cluster is configured to retrieve the encrypted data and the encrypted key from the remote computing system, decrypt the encrypted key to produce the cryptographic key, decrypt the encrypted data using the cryptographic key to access the target information, and configure itself based on the target information.

17. The system of claim 16, wherein the memory further includes instructions that are executable by the processor for causing the processor to:
    subsequent to encrypting the target information using the cryptographic key, delete the cryptographic key and the encrypted key from one or more memories of the system; and
    subsequent to transmitting the encrypted data to the remote computing system, delete the encrypted data from the one or more memories.

18. The system of claim 16, wherein the memory further includes instructions that are executable by the processor for causing the processor to:
    generate the cryptographic key by using a number generator that is external to the trusted platform module; and
    provide the cryptographic key to the trusted platform module for use by the trusted platform module in generating the encrypted key.

19. The system of claim 16, wherein the memory further includes instructions that are executable by the processor for causing the processor to, subsequent to transmitting the encrypted data and the encrypted key to the remote computing system:
    receive the encrypted data and the encrypted key from the remote computing system;
    provide the encrypted key to the trusted platform module, the trusted platform module being configured to decrypt the encrypted key using a private key of the asymmetric key pair to obtain the cryptographic key;
    receive the cryptographic key from the trusted platform module; and
    obtain the target information by decrypting the encrypted data using the cryptographic key.

20. The system of claim 16, wherein the system is a distributed computing system, and wherein the remote computing system includes a repository that is external to the distributed computing system and accessible to the distributed computing system over a network, and wherein the repository is accessible to the computing cluster for retrieving the encrypted data and the encrypted key.

* * * * *